Aug. 31, 1926.
O. SEIFFERT
1,597,731
AUTOMATICALLY GRIPPING CHUCK
Filed May 22, 1922
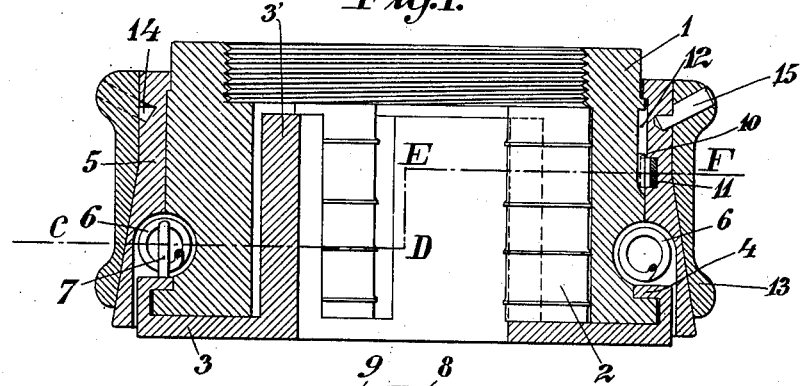
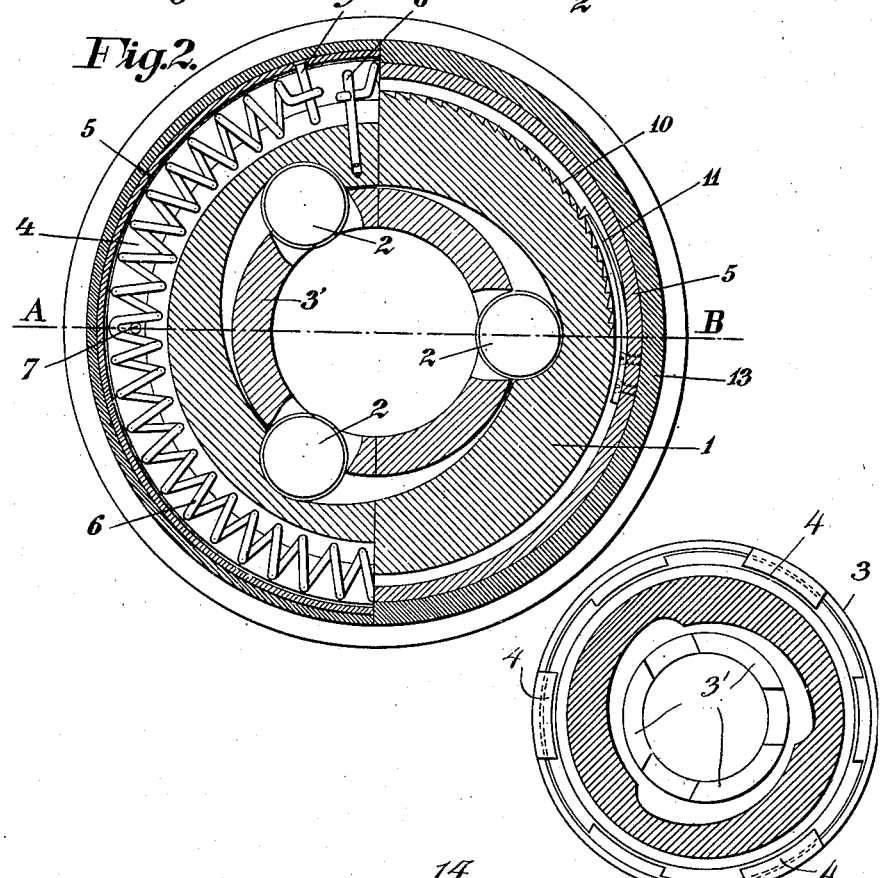
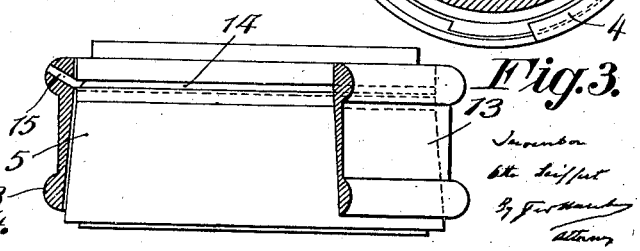

Patented Aug. 31, 1926.

1,597,731

UNITED STATES PATENT OFFICE.

OTTO SEIFFERT, OF VIENNA, AUSTRIA.

AUTOMATICALLY-GRIPPING CHUCK.

Application filed May 22, 1922, Serial No. 562,843, and in Great Britain April 6, 1922.

This invention relates to an automatically-gripping chuck which renders it possible to change the workpiece while the work is rotating and in which it is quite immaterial whether the jaws gripping the workpiece are cylindrical, prismatic or otherwise shaped.

The essence of the invention consists in that the gripping and releasing parts are mounted in the main or cam member so that the height of the chuck only exceeds the length of the jaws by very little, the diameter of the chuck remaining approximately normal. The power-transmitting or locking cam faces are in the main or cam member which may be secured direct to the working spindle of the machine. In this way the upper wall is dispensed with and is replaced by the spindle which takes up the axial thrust of the gripping jaws.

A construction according to the present invention is illustrated in the accompanying drawings, in which.

Figure 1 is a longitudinal section along the line A—B of Figure 2, and

Figure 2 is a section along the line C, D, E, F of Figure 1.

Fig. 3 illustrates in horizontal section the bayonet joint for connecting the cam and cage members.

Fig. 4 shows in side elevation, partly in section, the means for rotatably coupling the guard and coupling members.

The cam member 1 carries the gripping members or jaws 2 which in the present case are cylindrical rollers 2 guided in a cage ring 3 the latter having extensions projecting into a recess in the cam member and an annular flange extending beyond and engaging the outer face of the cam member. In the illustrated embodiment the cage ring 3 is secured to the member 1 in the manner of a bayonet-joint such as by inwardly projecting portions 4 secured to the flange of the cage ring 3. In a certain position of the cage ring 3 and the member 1, the said pins pass through recesses in the projecting bottom of the member 1 and are caused to rest on the same by a relative rotation of the cage ring 3 with respect to the member 1. The latter is surrounded by the clamping or locking member 5 connected to the cam member by a helical spring 6 arranged in a circle and located partially in a recess of the cam member and partially in a recessed portion of the locking member. As illustrated in Figure 2, one end of the spring is fastened to a pin 9 of the locking member 5, and the other to a pin 8 of the cam member 1 so that the said spring constantly tends to keep the latter and the locking member 5 in a definite relative position. Another pin 7 secured to the outer edge of the flange of the cage ring 3 engages the spring 6. The latter is compressed through the pins 8 and 9 when the locking member 5 is rotated relatively to the cam member 1, the cage ring 3 being moved through the pin 7. The gripping jaws or rollers are thus caused to move along the cam faces and are also radially displaced until they bear on the workpiece introduced into the opening of the chuck. On further rotating the member 5, the portion of the spring 6 comprised between the pins 7 and 9 is further compressed so that the gripping jaws are always kept under pressure. When force is exerted on the workpiece the jaws roll further on and are therefore wedged tighter between the workpiece and the cam faces so that the gripping pressure is automatically increased.

The locking member has now to be locked in this position of the parts; in the example illustrated a ratchet device is provided for that purpose. A suitable portion of the outer face of the cam member 1 has ratchet teeth 10 cooperating with a spring pawl 11 riveted to the locking member 5. This arrangement allows (as known) of the relative rotation of the two parts in one direction only, the said parts being locked when rotated in the opposite direction. The cam member has a recessed portion 12 above the ratchet teeth so that the pawl 11 lies in the said recessed portion when the locking member is shifted axially, thus releasing the connection between the locking and cam members and causing the spring 6 and the parts operated thereby to resume their normal position. The cage ring being now in its initial position, the opening of the chuck is brought to zero. A further advantage of this arrangement is that the pawl 11 in the groove 12 prevents the locking member 5 from slipping off the cam member and when the said member is shifted again the pawl automatically locks the parts.

As already stated, the chuck may be tightened and released while the apparatus is operative, the locking member participating in the rotation of the cam member. A guard or outer protecting casing 13 covers the said locking member to prevent the hand from being injured. The guard does not partake of the rotation of the locking member but is adapted to actuate the latter by means of projections, wedges or the like. In the construction illustrated the lower portion of the locking member is in the shape of a cone against which the outer casing bears. This conical portion acts also as a friction clutch exercising action upon the locking member when the chuck is tightened. The locking member has an annular groove 14 cut in the vicinity of its upper edge to receive one or more pins 15 traversing the outer casing or guard 13 so that any axial movement of the said casing is followed by the locking member.

The pins 15 are prevented from falling out by cutting a flat on the end of the pin engaging the groove 14, the latter being in cross-section adapted to the shape of the pin, so that the same cannot be turned or axially moved.

The groove is widened at a suitable place to correspond to the diameter of the pin, in order to offer no obstacle or resistance to the insertion of the pin.

According to the invention, the gripping jaws 2 have chisel-shaped projections to prevent the workpiece from slipping axially. The said jaws being cylindrical in the construction illustrated, these projections are annular rings or collars of suitable cross-section which of course project but to a small extent on the faces of the jaws.

I claim:

1. A cam operated chuck comprising a cam member, an operating sleeve member, and a jaw carrying cage, said sleeve and cage being rotatable relatively to said cam member in actuating the jaws; a coil spring connecting said cam and sleeve in such a manner that the rotation of the sleeve relatively to said cam member compresses the spring along its entire length, said spring engaging intermediate its length the said cage causing rotation of said cage relatively to said cam to close the jaws, continued rotation of said sleeve further compressing the spring with relation to said cage to keep the cage and jaws under steady pressure, and means to lock the chuck in the operative position.

2. A cam operated chuck, such as covered by claim 1, in which a pin engaging the spring intermediate its ends and connected to the cage determines the position of the part of the spring which is subjected to the further compression.

3. A cam operated chuck, such as covered by claim 1, in which said operating sleeve is adjustable axially in one direction to connect it with the cam member by a locking device to lock the chuck in the operative position and in which said sleeve is adjustable axially in the other direction to disengage it from the cam member to open the chuck.

4. A cam operated chuck, such as covered by claim 1, in which the locking means is operated by the axial adjustment of the sleeve relatively to said cam member and comprises a spring pawl secured to the sleeve and cooperating upon axial movement of said sleeve in one direction, with ratchet teeth on the cam member and, upon movement of said sleeve in the other direction, entering a groove in said cam member, the upper wall of the groove cooperating with said spring to form a stop preventing the sleeve from slipping off the cam member.

In testimony whereof I affix my signature.

OTTO SEIFFERT.